US009213849B2

(12) United States Patent
Chusing et al.

(10) Patent No.: US 9,213,849 B2
(45) Date of Patent: Dec. 15, 2015

(54) HIERARCHICAL ACCESS CONTROL ADMINISTRATION PREVIEW

(75) Inventors: Trevett B. Chusing, Grimsby (CA); John W. Stephenson, Blackstock (CA); Lei Zhang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 12/200,738

(22) Filed: Aug. 28, 2008

(65) Prior Publication Data

US 2010/0058434 A1    Mar. 4, 2010

(51) Int. Cl.
G06F 15/16       (2006.01)
G06F 21/60       (2013.01)

(52) U.S. Cl.
CPC ...... *G06F 21/604* (2013.01); *G06F 2221/2149* (2013.01)

(58) Field of Classification Search
CPC .......... G06F 21/604; G06F 2221/2141; G06F 2221/2149
USPC .............................................. 709/229; 726/4
See application file for complete search history.

(56) References Cited

U.S. PATENT DOCUMENTS

| | | | | |
|---|---|---|---|---|
| 5,675,782 A * | 10/1997 | Montague et al. | | 726/4 |
| 5,761,669 A * | 6/1998 | Montague et al. | | 707/758 |
| 7,461,158 B2 * | 12/2008 | Rider et al. | | 709/229 |
| 2003/0220838 A1 * | 11/2003 | Ishii et al. | | 705/14 |
| 2004/0254884 A1 * | 12/2004 | Haber et al. | | 705/51 |
| 2006/0173999 A1 * | 8/2006 | Rider et al. | | 709/225 |
| 2006/0294051 A1 * | 12/2006 | Kapadia et al. | | 707/1 |
| 2006/0294578 A1 * | 12/2006 | Burke et al. | | 726/2 |
| 2008/0098484 A1 * | 4/2008 | Cicchitto et al. | | 726/27 |
| 2009/0007262 A1 * | 1/2009 | Wallace et al. | | 726/21 |
| 2009/0119298 A1 * | 5/2009 | Faitelson et al. | | 707/9 |
| 2009/0240822 A1 * | 9/2009 | Rider et al. | | 709/229 |

* cited by examiner

*Primary Examiner* — Jonathan Bui

(74) *Attorney, Agent, or Firm* — Steven Greenberg, Esq.; CRGO Law

(57) ABSTRACT

Embodiments of the present invention provide a method, system and computer program product for hierarchical access control administration preview of access control rights for hierarchically organized content. In an embodiment of the invention, a method for rendering a hierarchical access control administration preview of access control rights for hierarchically organized content can be provided. The method can include rendering a view of hierarchically organized content in connection with corresponding access rights and proposing explicitly assigned access rights for selected content in the hierarchically organized content. The method also can include re-rendering the view to reflect both the proposed explicitly assigned access rights for the selected content and also implicitly resulting assigned access rights for the children of the selected content.

8 Claims, 1 Drawing Sheet

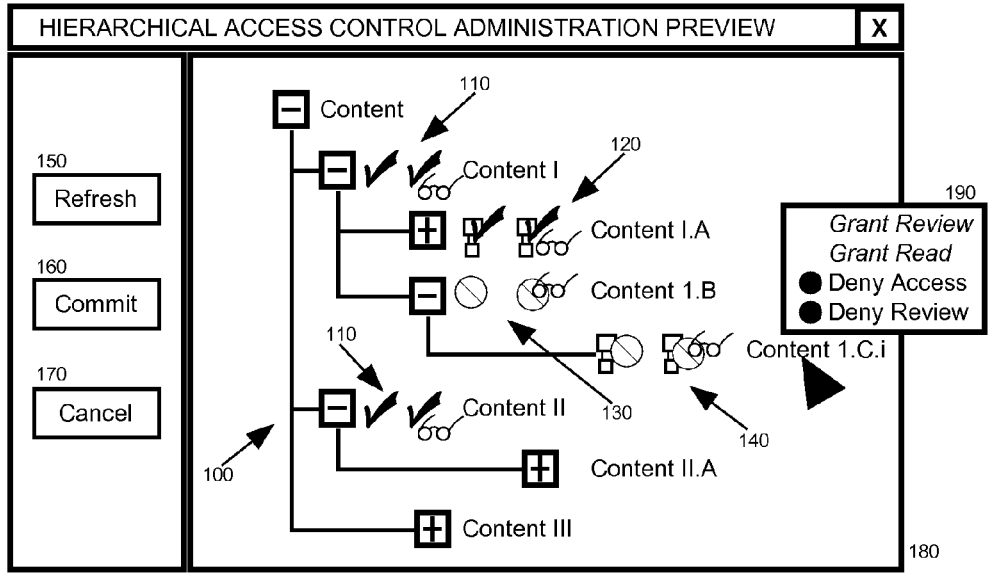
FIG. 1
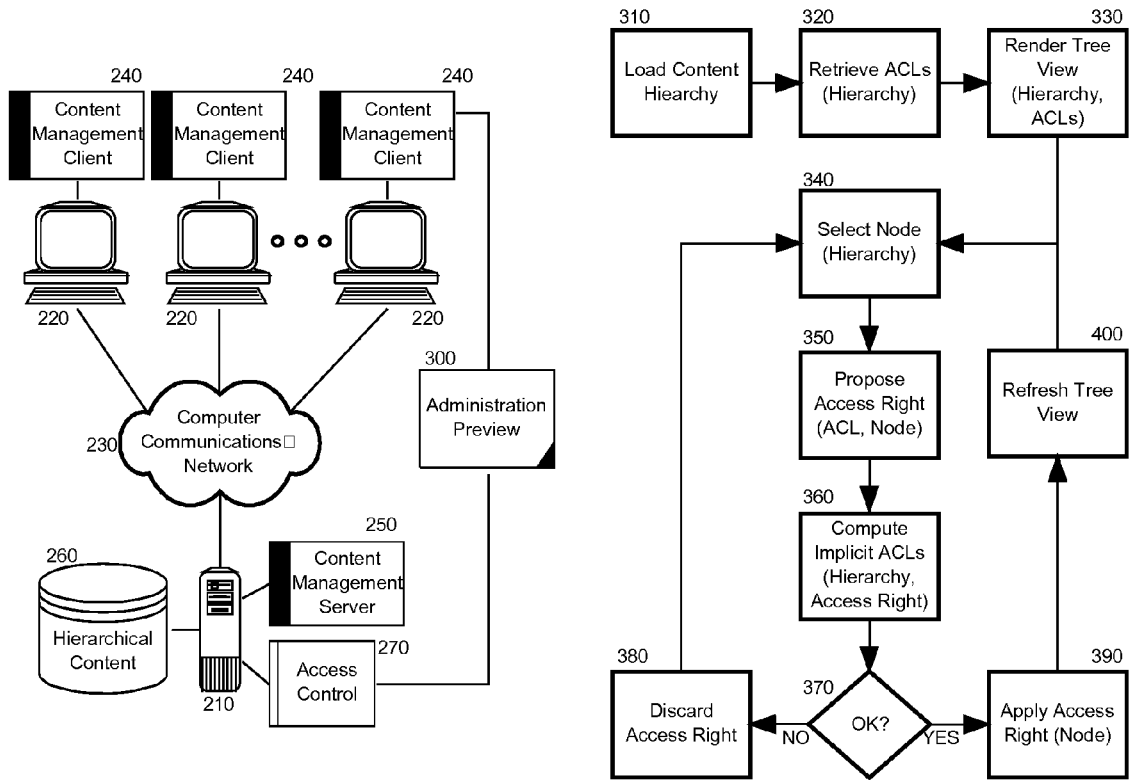
FIG. 2   FIG. 3

HIERARCHICAL ACCESS CONTROL ADMINISTRATION PREVIEW

BACKGROUND OF THE INVENTION

1. Field of the Invention

The present invention relates to the field of access control and rights management for electronic content and more particularly to visualization of access control rights for hierarchically organized content.

2. Description of the Related Art

Content drives the utility of a computer program. No matter the nature of the computer program, generally, a computer program accesses content, manipulates content, presents content and stores content. Much attention during the development of a computer program focuses on the efficient storage of content. With the advent of vast multi-user computing applications distributed over the global Internet, however, substantially greater attention has been placed recently on access control to content accessible by multiple different end users.

Access control refers to the restriction of access to content based upon a number of factors that may include the nature of the content sought for access, the identity of the user seeking access to the content, or the role of the user seeking access to the content. Early attempts at access control embedded the access control logic in direct connection with the program code providing access to content. Even for the most ordinary application, however, creating and maintaining a consistent access control scheme across a vast code base can be difficult and ill advised. As such, at present, it is preferred to define an entire data structure for permitting or restricting access to different content in a multi-user computing application, such that every attempt to access content in a computing application can refer to a central access control list (ACL) in order to determine whether or not to grant the specified type of access to particular content in the computing application.

The management of access control, in of itself, can be a manually tedious process. The process of access control can be even more complex when applying access control to hierarchically organized content. Generally referred to as a "tree", a hierarchically organized set of content can include a selection of nodes arranged hierarchically from a single root to many different leaves leaf via branches and sub-trees as it is well known in the art. When addressing access control for hierarchically organized content, the core concern is the determination of access rights for an authenticated user one node either expressly defined for the node, or implicitly defined (e.g. inherited) according to access rights afforded to the authenticated user in connection with a parent node.

Administering access rights for hierarchically organized content is known to be error prone. In this regard, typically an administrator of access control rights provides access rights for only a small subset of nodes representative of content in the hierarchy resulting in a sparsely populated hierarchy of access control rights. Nodes in the hierarchy that do not enjoy expressly assigned access control rights often inherit access control rights by implication of the rights expressly assigned to a parent node in the hierarchy. Identifying implied rights for a node in a view to the hierarchy can be challenging for a large hierarchy. Consequently, administrators frequently expressly assign access control rights to nodes in a hierarchy that conflict with the implicitly defined rights for the same node. Resolution rules generally are provided to resolve such conflicts; however, the resolution rules are not also visualized in the view to the hierarchy. Thus, the administrator of the access control rights to the hierarchy must rely upon deep knowledge of the resolution rules, in the absence of which the administrator has no remedy for visualizing the access control rights expressed in the view to the hierarchy.

BRIEF SUMMARY OF THE INVENTION

Embodiments of the present invention address deficiencies of the art in respect to visualizing access control rights for hierarchically organized content and provide a novel and non-obvious method, system and computer program product for hierarchical access control administration preview of access control rights for hierarchically organized content. In an embodiment of the invention, a method for rendering a hierarchical access control administration preview of access control rights for hierarchically organized content can be provided. The method can include rendering a view of hierarchically organized content in connection with corresponding access rights and proposing explicitly assigned access rights for selected content in the hierarchically organized content. The method also can include re-rendering the view to reflect both the proposed explicitly assigned access rights for the selected content and also implicitly resulting assigned access rights for the children of the selected content.

In one aspect of the embodiment, the method further can include applying the proposed explicitly assigned access rights responsive to a request to commit the proposed explicitly assigned access rights and otherwise discarding the proposed explicitly assigned access rights. In another aspect of the embodiment, the yet further can include displaying an indication of disabled access rights for selected content resulting from explicitly assigned access rights for a parent of the selected content conflicting with the disabled access rights.

In another embodiment of the invention, an access control data processing system can be configured for a hierarchical access control administration preview of access control rights for hierarchically organized content. The system can include a data store of hierarchically organized content, a host computing platform supporting a content management server providing multi-user access to the hierarchically organized content, and an access control module coupled to the content management server controlling access to the hierarchically organized content according to corresponding access rights. The system also can include administration preview logic coupled to the access control module.

The logic can include program code enabled to render a view of the hierarchically organized content in connection with the corresponding access rights, to propose explicitly assigned access rights for selected content in the hierarchically organized content, and to re-render the view to reflect both the proposed explicitly assigned access rights for the selected content and also implicitly resulting assigned access rights for the children of the selected content. In one aspect of the embodiment, the access rights can include any one of grant review, grant read, deny access and deny review.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a hierarchical access control administration preview of access control rights for hierarchically organized content;

FIG. 2 is a schematic illustration of an access control data processing system configured for a hierarchical access control administration preview of access control rights for hierarchically organized content; and, FIG. 3 is a flow chart illustrating a process for rendering a hierarchical access control administration preview of access control rights for hierarchically organized content.

DETAILED DESCRIPTION OF THE INVENTION

Embodiments of the present invention provide a method, system and computer program product for a hierarchical access control administration preview of access control rights for hierarchically organized content. In accordance with an embodiment of the present invention, different access rights for corresponding different hierarchically organized content can be rendered in connection with a view to the hierarchically organized content. Specifically, both explicitly assigned access rights and also implicitly resulting access rights can be rendered. Thereafter, explicitly assigned access rights can be proposed through the view for content in the hierarchy. Implicitly resulting access rights for children of the content can be computed and the view can be re-rendered to include both the proposed explicitly assigned access rights and the implicitly resulting access rights for the children. Thereafter, the proposed explicitly assigned rights can be applied or discarded at the discretion of the end user.

In illustration, FIG. 1 pictorially shows a hierarchical access control administration preview of access control rights for hierarchically organized content. As shown in FIG. 1, a hierarchical access control administration preview 180 can include a rendering of hierarchically organized content 100. Access rights 110 can be explicitly assigned to content in the hierarchically organized content 100 and rendered therewith. The explicitly assigned access rights 110 can include by way of example, the right to read associated content, the right to review (e.g. edit) associated content, as well as the denial of access to associated content and the denial of review rights for associated content. Implicitly resulting access rights 120 also can be rendered distinctively to indicate the inherited implicit assignment of the implicitly resulting access rights 120.

In operation, an end user can select content in the hierarchically organized content 100 in order to propose an explicit assignment of access rights 130. Implicitly resulting access rights 140 from the proposed explicit assignment of access rights 130 for child content of the selected content can be computed. Thereafter, the rendering of the hierarchically organized content 100 can be re-rendered or otherwise updated to reflect both the proposed explicit assignment of access rights 130 for the selected content and also the computed implicitly resulting access rights 140 for the child content of the selected content. The re-rendering can occur automatically or upon a manual selection of a refresh control 150. Based upon the re-rendering of the hierarchically organized content 100, the proposed explicit assignment of access rights 130 can be applied through a selection of a commit control 160. In contrast, the proposed explicit assignment of access rights 130 can be discarded through a selection of a cancel control 170.

Optionally, when proposing an explicit assignment of access rights for content through user interface 190, an indication of what access rights are not permitted resulting from a conflicting assignment of access for parent content can be provided. For example, where access rights for parent content provides for a denial of access, a proposal of grant read or grant review access rights can be disabled. In this way, the administration of access rights for the hierarchically organized content 100 can be facilitated by a visualization of the impact of a proposed explicit assignment of access rights for parent content on implicitly resulting access rights of child content.

The process described in connection with the hierarchical access control administration preview 180 of FIG. 1 can be implemented within an access control data processing system. In further illustration, FIG. 2 schematically depicts an access control data processing system configured for a hierarchical access control administration preview of access control rights for hierarchically organized content. The system can include a host computing platform 210 supporting the operating of a content management server 250. In this regard, the content management server 250 can be a multi-user computing application providing access to multiple different users to hierarchically organized content, for example different documents, stored in coupled data store of hierarchically organized content 260.

The content management server 250 can be configured for access by different users over computer communications network 230. Specifically, different users can interact with the content management server 250 through individual content management clients 240 executing in client computing devices 220. Notably, access control module 270 can be coupled to the content management server 250 through the host computing platform 210. Access control module 270 can be configured manage access control in respect to access rights assigned to different content in the data store of hierarchically organized content 260.

In accordance with an aspect of the embodiment of the invention, administration preview logic 300 can be coupled to the access control module 270. In particular, the administration preview logic 300 can be incorporated as part of the access control module 270 or the content management server 250. Alternatively, the administration preview logic 300 can be incorporated as part of each content management client 240. In any event, the administration preview logic 300 can include program code enabled to render different access rights for corresponding different hierarchically organized content in the data store of hierarchically organized content 260 in connection with a view to the hierarchically organized content. The program code further can be enabled to receive from an end user a proposal of explicitly assigned access rights through the view for content in the hierarchy. The program code yet further can be enabled to compute implicitly resulting access rights for children of the content and to re-render the view to include both proposed explicitly assigned access rights and the implicitly resulting access rights for the children. Finally, the program code can be enabled to apply or discard the proposed explicitly assigned rights at the discretion of the end user.

In yet further illustration of the operation of the administrative preview logic 300, FIG. 3 is a flow chart illustrating a process for rendering a hierarchical access control administration preview of access control rights for hierarchically organized content. Beginning in block 310, hierarchically organized content can be loaded into memory and in block 320, access rights for the hierarchically organized content can be retrieved. In block 330, a tree view of the hierarchically organized content can be rendered along with assigned access rights. Thereafter, in block 340 individual content can be selected in the hierarchically organized content.

In block 350, one or more explicitly access rights can be proposed for the individual content. In block 360, implicitly resulting access rights for the children of the individual content can be computed and rendered in the tree view. In decision block 370, if the proposed explicitly assigned access rights are determined to be acceptable, in block 290 the proposed explicitly assigned access rights can be applied to the selected content in block 390 and the tree view can be refreshed to reflect the application of the proposed explicitly assigned access rights in block 400. Otherwise, in block 380 the proposed explicitly assigned access rights can be discarded.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for rendering a hierarchical access control administration preview of access control rights for hierarchically organized content, the method comprising:
    rendering a view of hierarchically organized content in connection with corresponding access rights;
    proposing explicitly assigned access rights for selected content in the hierarchically organized content;
    re-rendering the view to reflect both the proposed explicitly assigned access rights for the selected content and also implicitly resulting assigned access rights for the children of the selected content; and,
    detecting a conflict between the explicitly assigned access rights for the selected content in the hierarchically organized content, and previously implicitly assigned access rights for the selected content resulting from an explicit assignment of access rights for a parent of the selected content, and responding to the conflict by disabling the explicitly assigned access rights for the selected content.

2. The method of claim 1, further comprising applying the proposed explicitly assigned access rights responsive to a request to commit the proposed explicitly assigned access rights and otherwise discarding the proposed explicitly assigned access rights.

3. The method of claim 1, further comprising displaying an indication of access rights that have been disabled for selected content resulting from explicitly assigned access rights for a parent of the selected content conflicting with the disabled access rights.

4. An access control data processing system configured for a hierarchical access control administration preview of access control rights for hierarchically organized content, the system comprising:
    a data store of hierarchically organized content;
    a host computing platform having a memory and supporting a content management server providing multi-user access to the hierarchically organized content;
    an access control module coupled to the content management server, the module comprising program code arranged to control access to the hierarchically organized content according to corresponding access rights; and,
    administration preview logic coupled to the access control module, the logic comprising program code enabled to render a view of the hierarchically organized content in connection with the corresponding access rights, to propose explicitly assigned access rights for selected content in the hierarchically organized content, to re-render the view to reflect both the proposed explicitly assigned access rights for the selected content and also implicitly resulting assigned access rights for the children of the selected content; and to detect a conflict between the explicitly assigned access rights for the selected content in the hierarchically organized content, and previously implicitly assigned access rights for the selected content resulting from an explicit assignment of access rights for a parent of the selected content, and to respond to the conflict by disabling the explicitly assigned access rights for the selected content.

5. The system of claim 4, wherein the corresponding access rights are rights selected from the group consisting of grant review, grant read, deny access and deny review.

6. A computer program product comprising a non-transitory computer usable medium embodying computer usable program code for rendering a hierarchical access control administration preview of access control rights for hierarchically organized content, the computer program product comprising:
    computer usable program code for rendering a view of hierarchically organized content in connection with corresponding access rights;
    computer usable program code for proposing explicitly assigned access rights for selected content in the hierarchically organized content;
    computer usable program code for re-rendering the view to reflect both the proposed explicitly assigned access rights for the selected content and also implicitly resulting assigned access rights for the children of the selected content; and, computer usable program code for detecting a conflict between the explicitly assigned access rights for the selected content in the hierarchically organized content, and previously implicitly assigned access rights for the selected content resulting from an explicit assignment of access rights for a parent of the selected content, and responding to the conflict by disabling the explicitly assigned access rights for the selected content.

7. The computer program product of claim 6, further comprising computer usable program code for applying the proposed explicitly assigned access rights responsive to a request to commit the proposed explicitly assigned access rights and otherwise discarding the proposed explicitly assigned access rights.

8. The computer program product of claim 6, further comprising computer usable program code for displaying an indication of access rights that have been disabled for selected content resulting from explicitly assigned access rights for a parent of the selected content conflicting with the disabled access rights.

\* \* \* \* \*